United States Patent [19]
Hosoda et al.

[11] Patent Number: 5,223,688
[45] Date of Patent: Jun. 29, 1993

[54] FLUID LEVEL ADJUSTING APPARATUS IN AN ELECTRIC DISCHARGE MACHINING TANK

[75] Inventors: Hiroshi Hosoda; Toshiyuki Aso, both of Yamanashi, Japan

[73] Assignee: Fanuc Ltd, Minamitsuru, Japan

[21] Appl. No.: 777,527

[22] PCT Filed: Apr. 5, 1990

[86] PCT No.: PCT/JP91/00454
§ 371 Date: Dec. 5, 1991
§ 102(e) Date: Dec. 5, 1991

[87] PCT Pub. No.: WO91/15325
PCT Pub. Date: Oct. 17, 1991

[30] Foreign Application Priority Data
Apr. 5, 1990 [JP] Japan .................. 2-89040

[51] Int. Cl.⁵ .......................... B63H 1/10; B63H 7/36
[52] U.S. Cl. .................. 219/69.11; 137/577; 219/69.14
[58] Field of Search .......... 219/69.1, 69.11, 69.14; 137/577, 590

[56] References Cited

U.S. PATENT DOCUMENTS

| | | | |
|---|---|---|---|
| 3,646,961 | 3/1972 | Marquardson | 137/577 |
| 4,153,071 | 5/1979 | Black et al. | 137/577 |
| 4,162,745 | 7/1979 | Anderson, Jr. | 137/577 |
| 4,755,651 | 7/1988 | Tsutsui et al. | 219/69.14 |
| 4,978,827 | 12/1990 | Sakai | 219/69.14 |

FOREIGN PATENT DOCUMENTS

| | | | |
|---|---|---|---|
| 77992 | 4/1962 | France | 137/590 |
| 39-20495 | 9/1964 | Japan . | |
| 55-157434 | 12/1980 | Japan . | |
| 59-205222 | 11/1984 | Japan . | |
| 63-272424 | 11/1988 | Japan | 219/69.14 |

OTHER PUBLICATIONS

Patent Abstracts of Japan, vol. 5, No. 33 (M-57) (705) Feb. 28, 1981.

*Primary Examiner*—Geoffrey S. Evans
*Attorney, Agent, or Firm*—Staas & Halsey

[57] ABSTRACT

A fluid level adjusting apparatus in an electric discharge machining tank includes an exhaust pipe connected to a machining fluid exhaust port of the machining tank, an adjustment pipe having an upper opening end and a lower opening end connected to the exhaust pipe and height adjusting apparatus automatically adjusting the height of the upper opening end of the adjustment pipe so that machining fluid in the electric discharge machining tank is drained out of the machining tank through the upper opening end of the adjustment pipe to maintain the fluid level of the machining fluid at the height of the upper opening end. The height adjusting apparatus includes a driving section for generating a rotating force, a transmission section connected to the driving section for transmitting the rotary driving force, a converting section connected to the transmission section for converting the transmitted rotary driving force into a linear force for adjusting the height of the adjustment pipe upper end and a controlling section for delivering fluid level adjusting command data to the driving section.

6 Claims, 4 Drawing Sheets

FLUID LEVEL ADJUSTING APPARATUS IN AN ELECTRIC DISCHARGE MACHINING TANK

TECHNICAL FIELD

The present invention relates to a fluid level adjusting apparatus in an electric discharge machining tank.

BACKGROUND ART

An electric discharge machine is arranged to perform electric discharge machining, with a workpiece immersed in machining fluid filled in an electric discharge machining tank, or while jetting the machining fluid from a nozzle toward the workpiece. In the case of machining the workpiece immersed in the machining fluid, it is undesirable if an upper wire guide or the like is immersed in the machining fluid, or if the upper part of the workpiece is exposed above the machining fluid level. Conventionally, therefore, an opening which extends vertically is formed in the peripheral wall of the electric discharge machining tank, and a fluid level adjusting plate is attached to the opening-formed portion of the peripheral wall of the machining tank in a manner vertically slidable relative to the peripheral wall, so as to make it possible to manually adjust the height of the top edge of the plate for adjustment of the fluid level in accordance with the workpiece thickness.

However, according to the aforementioned conventional fluid level adjusting device, it takes time to manually adjust the height of the top edge of the fluid level adjusting plate. Also, it is difficult to maintain the watertightness between the fluid level adjusting plate and the peripheral wall of the machining tank, and hence machining fluid tends to leak through a gap between the peripheral wall and the plate. For this reason, conventionally, in order to compensate for the leakage of the machining fluid, a machining fluid supplying pump is driven to discharge a little more volume of machining fluid than actually required, thus causing the machining fluid to overflow at all times. Therefore, the fluid level must be adjusted in dependence on the leakage of the machining fluid so as to assure proper overflow. This makes it difficult to accurately adjust the fluid level. In addition, extra energy is wasted for driving the pump, leading to a shortened service life of the pump.

DISCLOSURE OF THE INVENTION

The object of the present invention is to provide a fluid level adjusting apparatus capable of easily and accurately adjusting the fluid level of machining fluid in an electric discharge machining tank.

To achieve the above-mentioned object, the fluid level adjusting apparatus of the present invention comprises an exhaust pipe communicated with a machining fluid exhaust port of an electric discharge machining tank, and an adjustment pipe which has an upper opening end and a lower opening end which is communicated with the exhaust pipe. The height of the upper opening end of the adjustment pipe is adjustable, and the machining fluid in the electric discharge machining tank is drained out of the electric discharge machining tank via the upper opening end of the adjustment pipe, so that the fluid level of the machining fluid is maintained at the height of the upper opening end.

Preferably, the fluid level adjusting apparatus further includes a height adjusting mechanism for automatically adjusting the height of the upper opening end of the adjustment pipe, and a float switch for detecting an overflow of the machining fluid through the upper opening end of the adjustment pipe.

As described above, according to the present invention, machining fluid is drained out of an electric discharge machining tank through the upper opening end of an adjustment pipe which is communicated with a machining fluid exhaust port in the electric discharge machining tank via an exhaust pipe, the height of the upper opening end being adjustable, so that the leakage of the machining fluid through a gap between the fluid level adjusting apparatus and the electric discharge machining tank can be easily and reliably prevented by watertightly connecting the exhaust pipe and the adjustment pipe. Thus, unlike the prior art wherein the fluid level is adjusted while monitoring the degree of the leakage of machining fluid and the overflow of the machining fluid from the machining tank through the upper edge of a fluid level adjusting plate, the fluid level can be easily and reliably adjusted by simply adjusting the height of the upper opening end of the adjustment pipe. Furthermore, since no leakage of machining fluid occurs, the fluid level needs to be adjusted only once before starting electric discharge machining. Also, since the fluid level does not lower even if a machining fluid supplying pump is stopped immediately after the fluid level adjustment, no energy is wasted for driving the pump, resulting in a longer service life of the pump.

Preferably, the height of the upper opening end of the adjustment pipe is automatically adjusted, and hence automatic adjustment of the fluid level can be achieved. Further, since the overflow of the machining fluid from the upper opening end of the adjustment pipe is detected by a float switch, it is possible to accurately and quickly recognize the completion of the fluid level adjustment.

BEST MODE OF CARRYING OUT OF THE INVENTION

Figure 1:
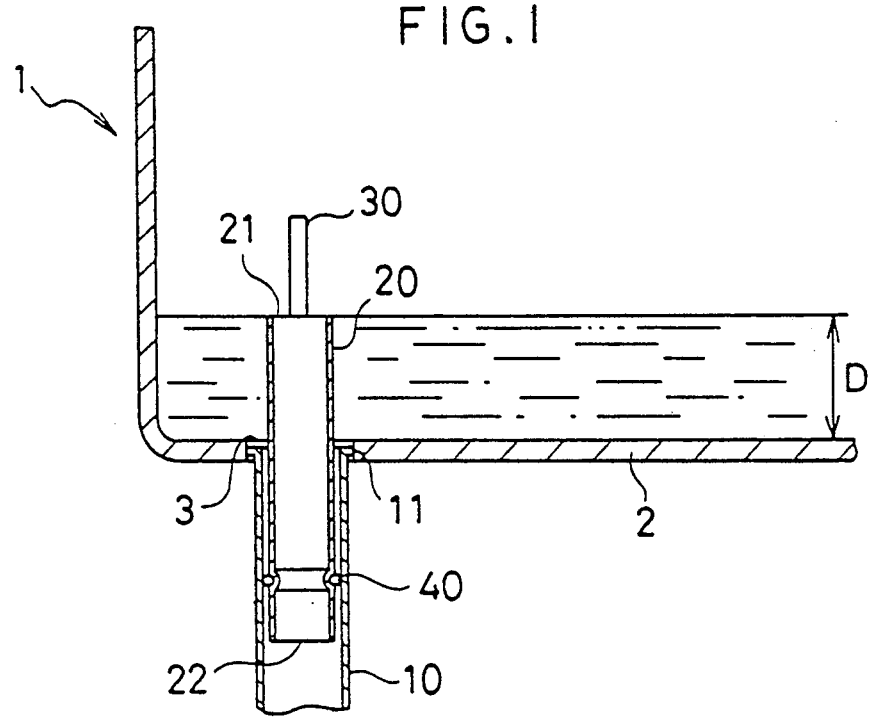
FIG. 1 is a fragmentary front sectional view of a fluid level adjusting apparatus according to a first embodiment of the present invention.

Referring to FIG. 1, an electric discharge machining tank 1 for storing machining fluid has a bottom wall 2 which is formed with a stepped machining fluid exhaust port 3. The fluid level adjusting apparatus, according to a first embodiment of the present invention, is provided with an exhaust pipe 10 having at its upper end a flange 11 watertightly fitted and fixed to the stepped exhaust port 3, and an adjustment pipe 20 slidably fitted into the exhaust pipe. The adjustment pipe 20 cooperates with the exhaust pipe 10 to constitute an expansion/contraction pipe for fluid level adjustment. The exhaust pipe 10 is detachably fixed to the machining tank 1, or fixed to the machining tank 1, by welding or the like, to prevent leakage of machining fluid through a gap between the exhaust pipe and the machining tank.

Fixed to the adjustment pipe 20 through a support member (not shown) is a rod 30 which extends upward along the axis of the adjustment pipe 20. An operator is permitted to slide the adjustment pipe 20 relative to the exhaust pipe 10 by holding the rod 30 and moving the rod 30 vertically of the machining tank 1, whereby the operator can adjust a distance between the bottom wall 2 of the machining tank and an upper opening end 21 of the adjustment pipe 20, i.e., a fluid level D, without touching the machining fluid.

An O-ring 40 is disposed in an annular groove formed in the lower outer peripheral face of the adjustment pipe 20 in urged contact with the inner peripheral face of the exhaust pipe 10, so as to prevent the leakage of the machining fluid through a gap between the inner peripheral surface of the exhaust pipe 10 and the outer peripheral surface of the adjustment pipe 20, and to retain the adjustment pipe 20 in the exhaust pipe 10 by the sliding resistance produced between the inner peripheral surface of the exhaust pipe 10 and the O-ring 40.

In the following, the operation of the fluid level adjusting apparatus shown in FIG. 1 will be explained.

Prior to start of electric discharge machining, when an operator causes the upper opening end 21 of the adjustment pipe 20 to be positioned at a desired vertical position by sliding the adjustment pipe relative to the exhaust pipe 10, the adjustment pipe 20 is retained at that height by the O-ring 40. Then, the machining fluid is supplied to the machining tank 1 from a machining fluid supplying apparatus (not shown) via a quick filling nozzle (not shown). Thereafter, when the machining fluid level in the machining tank 1 reaches the height of the upper opening end 21 of the adjustment pipe 20, the machining fluid overflows from the machining tank 1 via the upper opening end 21, and flows into the adjustment pipe 20 to be drained out of the machining tank via the exhaust pipe 10 which is communicated with the lower opening end 22 of the adjustment pipe 20. Immediately after the overflow of the machining fluid, the supply of the machining fluid is stopped, to complete the fluid level adjustment. After the fluid level adjustment, the leakage of the machining fluid from the machining tank 1 is prevented by the O-ring 40, and no substantial lowering of the fluid level occurs.

Next, with reference to FIGS. 2-8, a fluid level adjusting apparatus according to a second embodiment of the prevent invention will be explained.

As compared with the first embodiment arranged to manually adjust the fluid level by sliding the adjustment pipe in the exhaust pipe, an apparatus of the second embodiment differs therefrom in that it uses a bellows type adjustment pipe, automatically adjusts the height (fluid level) of the upper opening end of the adjustment pipe, and automatically detects the overflow of the machining fluid (completion of the fluid level adjustment).

Figure 2:
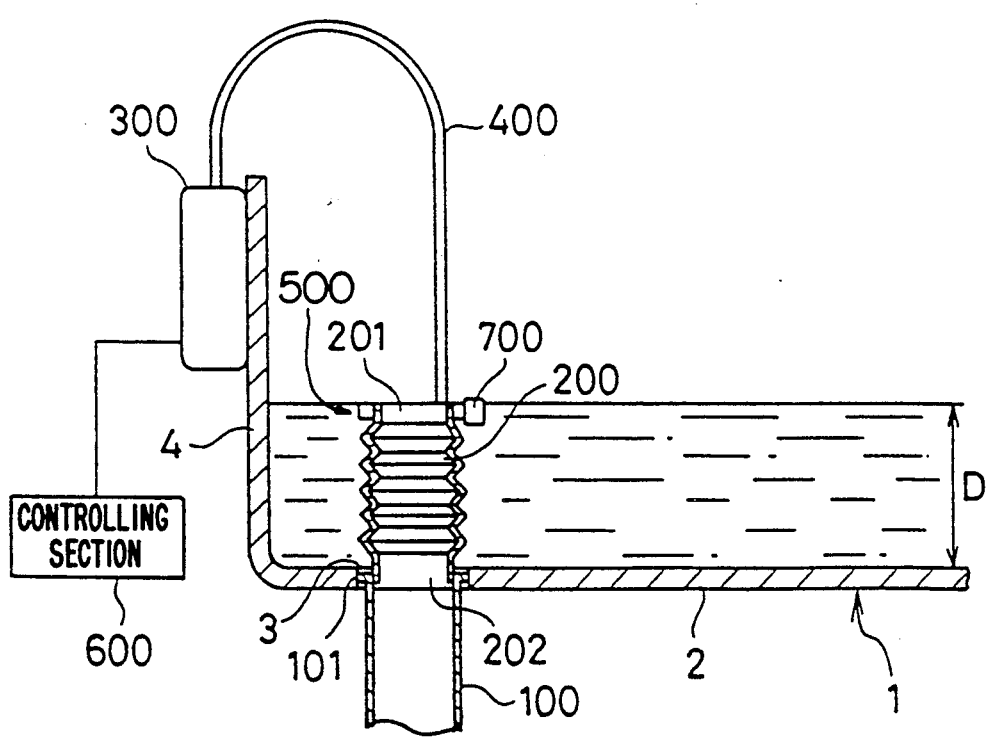
FIG. 2 is a fragmentary front sectional view of a fluid level adjusting apparatus according to a second embodiment of the present invention, with a converting section of its height adjusting mechanism omitted.
Figure 3:
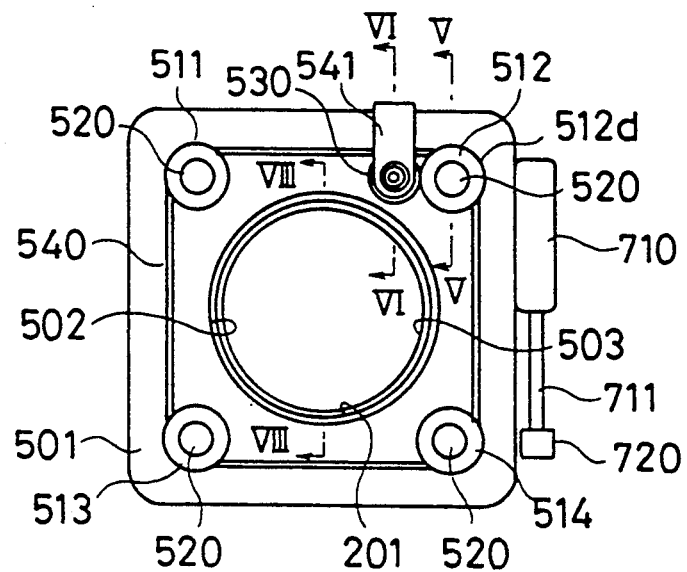
FIG. 3 is a plan view showing a converting section of a height adjusting mechanism of the apparatus shown in FIG. 2, together with a float switch.

Referring to FIG. 2, the fluid level adjusting apparatus is provided with an exhaust pipe 100 similar to the exhaust pipe 10 of FIG. 1, and a bellows-type adjustment pipe 200 for adjusting the fluid level, the adjustment pipe 200 being expandable and contractible, and capable of self-retaining an expanded or contracted state once set. A flange 101 of the exhaust pipe is watertightly fitted and fixed to the stepped exhaust port 3 formed in the bottom wall 2 of the electric discharge machining tank 1, and a lower opening end 202 of the adjustment pipe is watertightly fitted and fixed to the flange 101. Both the pipes 100 and 200 are detachably fixed to the machining tank 1, or permanently fixed to the machining tank.

The fluid level adjusting apparatus is provided with a height adjusting mechanism for automatically adjusting the height of the upper end 201 of the adjustment pipe. The height adjusting mechanism consists of a driving section 300 fixed to a machining fluid peripheral wall 4 for generating a rotary driving force, a transmission section 400 for transmitting the rotary driving force, a converting section 500 for converting the transmitted rotary driving force into a linear driving force for moving the adjustment pipe upper end 201 vertically, and a controlling section 600 for delivering fluid level adjusting command data to the driving section 300.

The controlling section 600 consists of, e.g., a numerical control unit of a type accommodating therein a computer and having conventional functions of controlling the operation of an electric discharge machine in accordance with a program. Machining data including the thickness of a workpiece, and a correction value used for calculating a target fluid level are stored in a computer memory, e.g., a nonvolatile random access memory. Also stored as a reference value of the vertical position of the upper end 201 of the adjustment pipe is a known value which indicates the distance between the upper end 201 of the adjustment pipe and the inner surface of the bottom wall 2 of the machining tank when the expandable and contractible adjustment pipe 200 is in its most contracted state. In case that the height of the inner surface of the machining tank bottom wall 2 is taken as the origin of the fluid level, the above-mentioned distance between the upper end of the pipe and the inner surface of the bottom wall indicates the fluid level.

The controlling section 600 is arranged to calculate the target fluid level D which is equal to the sum of the workpiece thickness, determined based on the machining data, and the correction value, and which ensures optimum immersion of a workpiece (not shown) in the machining fluid in the machining tank 1, and is arranged to cause the thus calculated value D to be stored in the memory as data indicative of the present position moving of the upper end 201 of the adjustment pipe, and is arranged to deliver, to the driving section 300, fluid level command data which consists of motor rotation amount data, corresponding to an absolute value of a difference between the calculated value D and the present position data (the reference value for the first workpiece), and motor rotation direction data is determined in dependence on the sign of the difference.

The driving section 300 accommodates therein a motor driving circuit (not shown) which responds to the fluid level adjustment command data supplied from the controlling section 600, a motor (not shown) drivingly controlled by the driving circuit, and a reduction gear (not shown) interposed between a motor output shaft and the input side of the transmission section 400. The motor driving circuit is designed to perform open-loop control, so as to drive the motor in a commanded rotational direction represented by the motor rotational direction data for a time period corresponding to the motor rotation amount data. Further, the driving section 300 has a pump driving circuit for controlling the drive of the pump associated with the quick filling nozzle of the machining fluid supplying apparatus (not shown) of the electric discharge machine.

Figure 6:
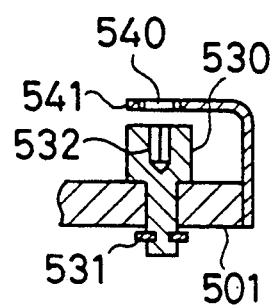
FIG. 6 is a fragmentary longitudinal sectional view, taken along the line VI—VI of FIG. 3, showing a gear mounted on the driving plate of the height adjusting mechanism, together with a bent member.
Figure 7:
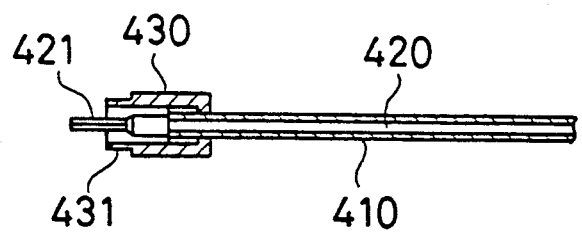
FIG. 7 is a fragmentary enlarged sectional view depicting an end portion of a transmission section of the height adjusting mechanism.

As shown in FIG. 7, the transmission section 400 consists of a flexible tube 410, and a flexible wire 420 rotatably disposed in the interior of the tube. One end of the wire 420 is coupled to a reduction gear output shaft of the driving section 300, and the other end of the wire is coupled to a gear 530 (FIGS. 3 and 4) of the converting section 500, so that a rotational force generated at the driving section is transmitted to the gear 530 via the wire 420. More specifically, a mouthpiece 430 is mounted to the end of the tube 410 at the gear 530 side in a manner rotatable relative to the tube but immovable in the direction of the tube axis, and a male thread 431 formed on the outer peripheral surface of the distal end portion of the mouthpiece is threadedly engaged with a female thread 541 formed on one end portion of a bent member 540 (FIG. 6) whose other end is fixed to a driving plate 501 (FIGS. 3 and 4) of the converting section 500 of the height converting mechanism. Further, a coupling member 421 which is hexagonal in its diametric cross section is fixed on the end of the wire 420 at the gear 530 side. The coupling member is fitted into a hexagonal socket 532 formed in the top surface of the gear 530 in alignment with the male thread 431, and the mouthpiece 430 is threadedly fixed to the bent member 540, so that the wire 420 is coupled to the gear 530 in a manner prevented from being removed therefrom. As shown in FIG. 6, the gear 530 is rotatably supported by the driving plate 501, and is arranged to be prevented from being removed from the driving plate by means of a C-shaped ring 531.

Figure 8:
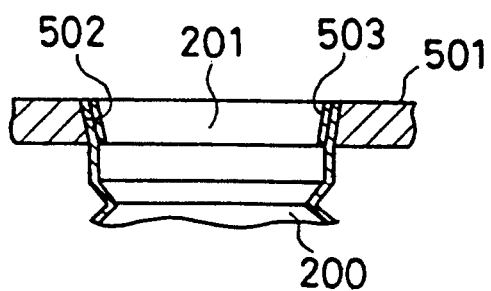
FIG. 8 is a fragmentary enlarged longitudinal sectional view, taken along the line VIII—VIII of FIG. 3, showing the upper end portion of a fluid level adjustment pipe coupled to the driving plate of the height adjusting mechanism.

The converting section 500 has the aforementioned driving plate 501. As shown in FIG. 8, a tapered hole 502 is provided at the center of the driving plate 501, and the pipe end 201 which fits in the tapered hole is fixed to the driving plate 501 with a fixing ring 503.

Figure 4:
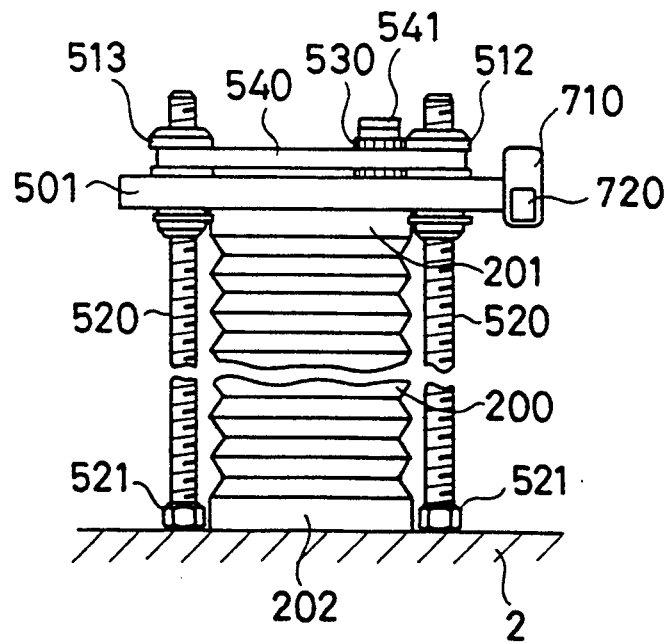
FIG. 4 is a front view showing the converting section of the height adjusting mechanism, together with the float switch.
Figure 5:
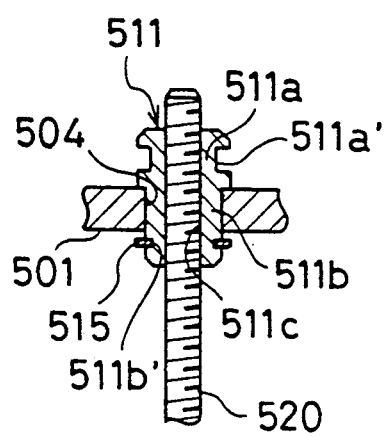
FIG. 5 is a fragmentary longitudinal sectional view, taken along the line V—V of FIG. 3, showing a rotary member mounted on a driving plate of the height adjusting mechanism, together with a threaded shaft.

The converting section 500 is further provided with first through fourth rotary components 511 through 514 which fit in respective through holes 504 provided in the four corners of the driving plate 501 so that they are free to rotate. As shown in FIG. 5, the diameter of the first rotary member 511 is larger than the diameter of the through holes 504, and it consists of a large-diameter portion 511a with a annular groove 511a' formed in its outer peripheral surface and a small-diameter portion 511b which fits in a through hole 504. The first rotary member is made axially inseparable from the driving plate 501 by the small diameter portion 511b and a C-shaped ring 515 fitted in a annular groove 511b' formed in the outer peripheral surface of the small-diameter portion 511b. Also, the first rotary member 511 is provided with a tapped through hole 511c which is formed along the axial center, and a matching one among threaded shafts 520 provided upright on the bottom wall 2 of the machining tank is screwed into the tapped hole 511c. The threaded shaft 520 is screwed into a tapped hole (not shown) formed in the bottom wall 2 of the machining tank, and fixed to the machining tank 1 with a fixing nut 521 as shown in FIG. 4.

The second through fourth rotary components 512 through 514 are configured in the same way as that of the first rotary member 511. However, the outer peripheral surface of the large-diameter portion of the second rotary member has gear teeth 512d to be meshed with the gear 530. The first to fourth rotary components 511 through 514 are all interlocked through a timing belt 540 engaged with the annular grooves in the respective large-diameter portions (one of them is depicted by a symbol 511a' in FIG. 5). Thus, when the second rotary member 512 rotates as the gear 530 rotates, the remaining rotary components turn in the same direction. This causes the driving plate 501 to move along the threaded shafts 520, thereby changing the height of the pipe end 201, i.e., the fluid level.

The fluid level adjusting apparatus is further provided with a float switch 700 for detecting the overflow of the machining fluid from the machining tank 1 into the exhaust pipe 100 via the pipe end 201. The float switch 700 is provided with a micro-switch 710 mounted on one side surface of the driving plate 501, and a float 720 which is fixed on the end of a lever 711 of said micro-switch and which floats on the fluid surface of the machining fluid in the machining tank 1. The float switch is designed to close the contact of the micro-switch 710 when the fluid level reaches the top surface of the driving plate 501 which corresponds to the upper end 201 of the adjustment pipe and the machining fluid begins to overflow from the machining tank 1 to the adjustment pipe 200 and the exhaust pipe 100 via the pipe end 201. Further, the pump driving circuit of the driving section 300 of the height adjusting mechanism is connected to the micro-switch 710 so that when the micro-switch contact is closed, the pump related to the quick filling nozzle is stopped to stop the machining fluid supply to the machining tank 1 through said nozzle.

The following describes the operation of the fluid level adjusting apparatus.

Prior to the adjustment of the fluid level for the first workpiece, the adjustment pipe 200 which is free to expand and contract is set in its most contracted state. The controlling section 600 calculates the target fluid level D by adding the correction value to the thickness of the first workpiece determined based on the machining data read from its built-in memory, then stores the calculated value D in the memory as the present position of the adjustment pipe upper end 201. Then, the controlling section reads the reference value of the height of the adjustment pipe upper end 201 from the memory, and sends out the fluid level adjustment command data, which comprises the motor rotation amount data corresponding to the absolute value of the deviation of the calculated value D from the reference value and the motor rotational direction data which indicates the forward rotation, to the driving section 300 of the height adjusting mechanism.

According to the data transmitted, the motor driving circuit of the driving section 300 runs the motor in the forward direction for a period of time based on the motor rotation amount data. The rotational force of the motor is transmitted to the gear 530 of the converting section 500 via the reduction gear of the driving section 300 and the wire 420 of the transmitting section 400. As the gear 530 turns, the second rotary member 512 of the converting section 500 which is turned by the gear, and the other rotary components 511, 513 and 514 which are connected to and driven by the second rotary member rotate, causing the driving plate 501 and the upper opening end 201 of the adjustment pipe 200 to move up along the threaded shaft 520.

When the motor stops, and the adjustment pipe upper end 201 is positioned at the target fluid level D, the pump related to the quick filling nozzle is actuated by the pump driving circuit of the driving section 300, and the machining fluid is supplied into the machining tank 1 via said nozzle. After that, when the actual fluid level reaches the pipe upper end 201, and the machining fluid begins to overflow from the machining tank 1 through the pipe end into the adjustment pipe 200 and the exhaust pipe 100, the contact of the micro-switch 710 closes, and a filling completion signal is sent from said switch to the pump driving circuit. In response to the signal, the pump driving circuit stops the pump to stop the machining fluid supply. Thus the fluid level adjustment for the first workpiece is completed.

The fluid level adjustment for the second and the subsequent workpieces is performed in the same manner as for the first workpiece. However, the controlling section 600 uses the current position data of the upper end of the adjustment pipe read from the memory in place of the reference value of the height of the adjustment pipe upper end 201 to calculate the motor rotation amount data. Also, it determines the motor rotational direction data depending on whether the deviation of the calculated target fluid level D from the current position data is positive or negative.

The present invention is not limited to the first and the second embodiments described above, but it can be implemented in diverse other variations.

Figure 9:
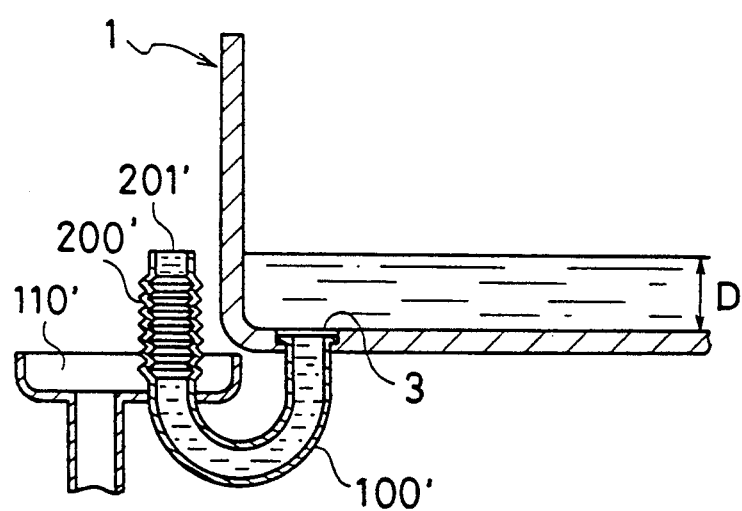
FIG. 9 is a fragmentary front sectional view depicting a variation of the fluid level adjusting apparatus of the present invention.

For instance, in the first and the second embodiments, the fluid level adjusting pipes 10 and 100 are installed in the machining tank 1, but they may be provided outside the machining tank. As shown in FIG. 9, for instance, a bellows type fluid level adjustment pipe 200' is formed into one piece on one end of a U-shaped exhaust pipe 100' whose other end is connected to the machining fluid exhaust port 3 in the bottom wall of the machining tank, and also a receiving pan 110' is provided to collect the machining fluid overflowing through an upper opening end 201'. According to the example of the variation, the leakage of the machining fluid can be completely prevented by welding the exhaust pipe to the part where the machining fluid exhaust port is formed in the machining tank. Further, when installing the height adjusting mechanism of the second embodiment to the apparatus of FIG. 9 which has the fluid level adjustment pipe 200' outside the machining tank 1, the transmitting section 400 can be easily eliminated by directly connecting the driving section 300 of the height adjusting mechanism to the converting section 500.

Further, in the first embodiment, the fluid level adjustment pipe 10 is comprised of a single pipe, but a telescopic type fluid level adjustment pipe consisting of a plurality of pipes may be used instead. In this case, the adjacent pipes are fitted so that they are free to slide but inseparable from each other, with O rings provided between the sliding surfaces of the adjacent pipes.

Further in the second embodiment and its variation example (FIG. 9), the bellows-type pipes 100 and 100' which are capable of self-retaining an expanded or contracted state are used, but a bellows-type pipe which cannot self-hold an expanded or contracted state may be used in combination with a retaining mechanism for retaining the upper end of the pipe at a certain height.

In place of the height adjusting mechanism of the second embodiment shown in FIG. 2 through FIG. 8, diverse other mechanisms may be employed. For instance, in the second embodiment, the motor driving circuit which performs the open-loop control on the motor in accordance with the fluid level adjustment command data is used, but a closed-loop control method may be used to control the motor in accordance with command data and an output of a pulse coder which is mounted on the motor and which detects an actual motor rotational position. Also in the second embodiment, a converting section 500 comprising a threaded shaft and rotary components which are screwed thereto and mounted on the driving plate is used, but in place of that, a Motor Cell-Top Cylinder (a product name) provided with a rod which freely moves for a stroke and a braking mechanism for holding said rod so that the rod cannot move, or various other driving mechanisms which use a wire, chain or rack pinion as its major member element and which linearly respond to command data received from the controlling section 600 may be used. In this case, the motor running time or motor running speed which correspond to diverse command data are filed and stored in the memory of the controlling section 600 or the motor driving circuit of the driving section 300 in advance, and the motor is driven for the motor driving time based on the command data or at the motor running speed based on the command data.

We claim:

1. A fluid level adjusting apparatus in an electric discharge machining tank comprising:
    an exhaust pipe connected to a machining fluid exhaust port of the electric discharge machining tank;
    an adjustment pipe which has an upper opening end and a lower opening end connected to said exhaust pipe; and
    means for automatically adjusting the height of said upper opening end of said adjustment pipe whereby machining fluid in said electric discharge machining tank is drained out of said electric discharge machining tank through said upper opening end of said adjustment pipe, thus maintaining the fluid level of the machining fluid at the height of said upper opening end; said height adjusting means comprising:
    a driving section for generating a rotating force;
    a transmission section connected to said driving section for transmitting the rotary driving force;
    a converting section connected to said transmission section for converting the transmitted rotary drive force into a linear force for adjusting the height of the adjustment pipe upper end; and
    a controlling section for delivering fluid level adjusting command data to said driving section.

2. The fluid level adjusting apparatus in an electric discharge machining tank according to claim 1, which still further comprises a float switch for detecting overflow of the machining fluid through the upper opening end of said adjusting pipe.

3. A fluid level adjusting apparatus according to claim 1, wherein said adjustment pipe is a bellows-type pipe.

4. A fluid level adjusting apparatus according to claim 1, wherein said transmission section comprises a flexible tube having a rotatable, flexible wire disposed therein.

5. A fluid level adjusting apparatus according to claim 1, wherein said converting section comprises a driving plate connected to said upper opening end of said adjustment pipe, at least one rotary member rotatably mounted on said driving plate, a shaft threadably engaged with said rotary member and means connecting said wire to said rotary member whereby rotation of said wire causes said rotary member to rotate to adjust the height of said driving plate and said upper opening end of said adjustment pipe.

6. A fluid level adjusting apparatus according to claim 1, wherein said exhaust pipe and said adjustment pipe are both external of the tank.

* * * * *

UNITED STATES PATENT AND TRADEMARK OFFICE
CERTIFICATE OF CORRECTION

PATENT NO. : 5,223,688
DATED : June 29, 1993
INVENTOR(S) : HIROSHI HOSODA and TOSHIYUKI ASO It is certified that error appears in the above-indentified patent and that said Letters Patent is hereby corrected as shown below:

FRONT PAGE [57] ABSTRACT, line 6, after "apparatus" insert

--for--.

Column 4, line 66, delete "position";

line 67, before "of the" (first occurrence) insert

--position--.

Signed and Sealed this

Twenty-first Day of June, 1994

BRUCE LEHMAN

Attest:

Attesting Officer    Commissioner of Patents and Trademarks